United States Patent [19]

Sakakima

[11] Patent Number: 4,670,972
[45] Date of Patent: Jun. 9, 1987

[54] METHOD FOR MAKING MAGNETIC HEADS

[75] Inventor: Hiroshi Sakakima, Osaka, Japan

[73] Assignee: Matsushita Electric Industrial Co., Ltd., Japan

[21] Appl. No.: 606,771

[22] PCT Filed: Aug. 10, 1983

[86] PCT No.: PCT/JP83/00260
§ 371 Date: Apr. 10, 1984
§ 102(e) Date: Apr. 10, 1984

[30] Foreign Application Priority Data

Aug. 10, 1982 [JP] Japan .................. 57-139415

[51] Int. Cl.⁴ .............................................. G11B 5/127
[52] U.S. Cl. ........................................ 29/603; 29/416;
51/281 R; 65/36; 65/42; 65/59.1; 65/60.2;
156/154; 156/235; 156/632; 156/634; 156/636;
156/645; 156/656; 156/657; 204/192.2;
204/192.23; 360/122
[58] Field of Search .................. 156/89, 634, 151, 154,
156/304.1, 632, 636, 645, 155, 157, 159, 242,
243, 233, 234, 235, 237, 241, 280, 310, 656, 657;
29/603, 416; 204/192 R, 192 M, 192.2, 192.23,
192.22, 192.15; 51/281 R, 283 R, 323; 65/18.2,
36, 42, 55, 56, 59.1, 59.4, 60.5, 60.2; 360/126,
127, 119, 120, 122

[56] References Cited

U.S. PATENT DOCUMENTS 3,629,519 12/1971 Hanak .................. 156/89 X

FOREIGN PATENT DOCUMENTS 43-13255 6/1968 Japan .
53-133418 11/1978 Japan .

OTHER PUBLICATIONS

Abstract of Japanese Document 55-73913 (Takehara), Jun. 4, 1980, Technical Library-Foreign Patent Publications.

Primary Examiner—Donald E. Czaja
Assistant Examiner—Thomas Bokan
Attorney, Agent, or Firm—Lowe, Price, LeBlanc, Becker & Shur

[57] ABSTRACT

In the manufacture of a magnetic head, a magnetic layer is sputtered or evaporated on a surface of a first substrate of glass or nonmagnetic material and a nonmagnetic material such as glass is sputtered on one end face of the composite body formed by the substrate and the magnetic layer to form a gap filling layer. A second substrate of the same material and thickness as the first is bonded thereto with the magnetic gap filling being interposed therebetween. Magnetic material is sputtered or evaporated on the bonded substrates until a predetermined thickness is reached to form a second magnetic layer. The magnetic layers are then lapped to reveal an edge of the gap filling layer between adjacent edges of the two magnetic layers.

Since the gap filling layer is formed by sputtering method, magnetic gap length can be precisely determined and since the thickness of the magnetic layers determines the track width, a magnetic head having a narrow width can be easily manufactured.

7 Claims, 22 Drawing Figures

METHOD FOR MAKING MAGNETIC HEADS

TECHNOLOGICAL FIELD

The present invention relates to a method for making magnetic heads.

TECHNOLOGICAL BACKGROUND

In recent years advances in high coercive metalized tape have stimulated research into magnetic heads which comprises high magnetic density core material. Promising materials for such magnetic cores can be found in Sendust (Tradename) and amorphous alloys. However, the method currently used in forming magnetic gaps in ferrite cores cannot readily be applied to the formation of magnetic gaps in such high magnetic density core materials. More specifically, in the current method use is made of glass which is sandwiched between ferrite core halves and bonded thereto by fusion at elevated temperatures. Advantages reside in the fact that in the fusion process the glass partially diffuses into the core material and increases the bonding strength and that a suitable glass material can be easily found to match the thermal expansion coefficient of the core material used. However, Sendust and amorphous alloys have a considerably low bonding strength to glass, and in addition the thermal expansion coefficient of Sendust is typically $170 \times 10^{-7}$ which is considerably greater than that of glass that ranges between $50 \times 10^{-7}$ and $120 \times 10^{-7}$. Mismatch in thermal expansion coefficient presents a serious problem. The low bonding strength is considered to arise from the fact that glass is less capable of diffusing into such materials than it is with ferrite materials. In the case of amorphous alloys, the difficulty is that their crystalization temperature, which is around 500° C., requires that glass fusion be effected at temperatures lower than this crystalization temperature. Otherwise, amorphous alloys would lose their required magnetic properties. Thus, fusion bonding is more difficult to achieve in the case of amorphous alloys than in the case of Sendust. Although the use of resinous materials can be considered as a gap filling material, their pronounced characteristic in thermal expansion and contraction renders them unsuitable for such applications where the gap length is required to meet the tolerance range of ±0.1 micrometers.

SUMMARY OF THE INVENTION

The present invention is therefore to eliminate the above-mentioned problems and has for its object the provision of a method whereby a magnetic gap is formed with a higher degree of precision.

According to the present invention, a magnetic gap is formed by the use of a sputtering method and supplementarily with the use of a bonding method in which glass or resin is employed as a strengthening material. The method of the present invention ensures high precision and ease with which magnetic heads are fabricated.

DESCRIPTION OF THE PREFERRED EMBODIMENTS

Figure 1A:
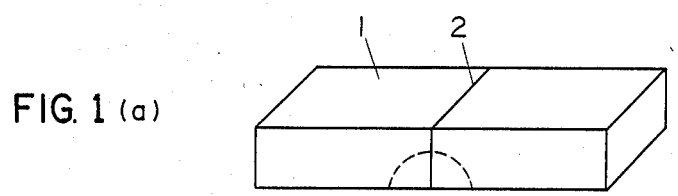
FIGS. 1a–1h and 2a–2c are perspective views illustrating a method for making a magnetic head according to the present invention.
Figure 1B:
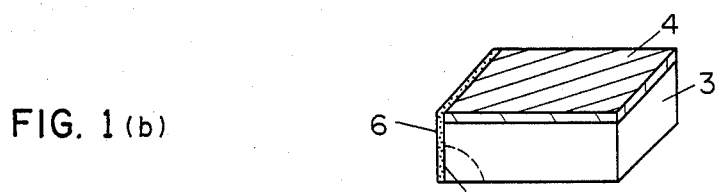
Figure 1C:
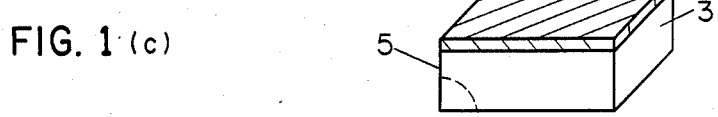
Figure 1D:
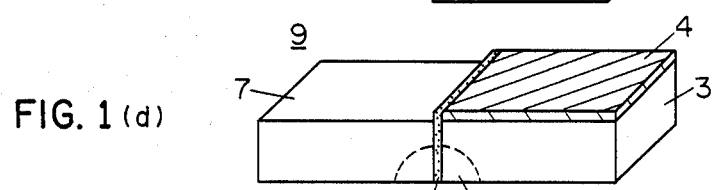
Figure 1E:
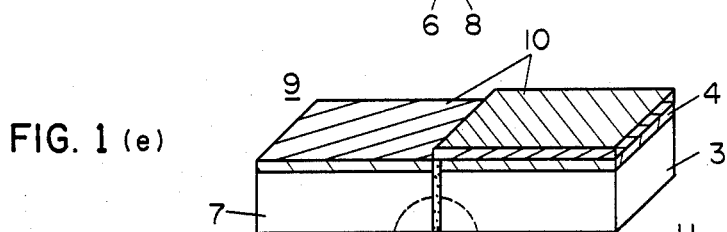
Figure 1F:
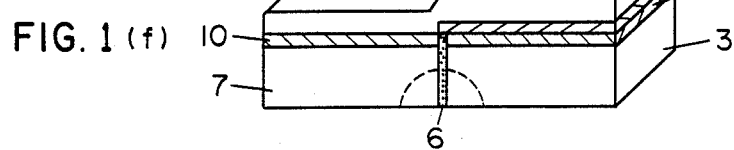
Figure 1:
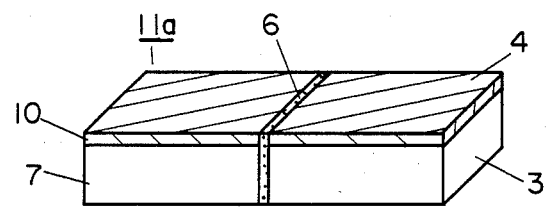
Figure 1:
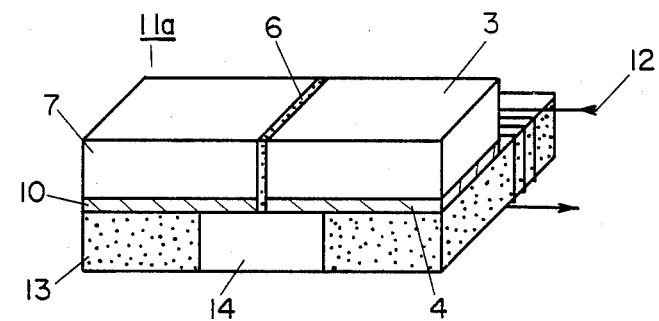

FIG. 1 illustrates the steps 1a to 1h of making a magnetic head according to an embodiment of the present invention.

A substrate 1 is cut off along a central portion 2, forming substrate halves 3 and 7. On the surface of a substrate half 3 a magnetic layer 4 is formed by a sputtering method as shown in FIG. 1. An end face 5 is polished to a mirror finish and a nonmagnetic gap filling layer 6 is sputtered thereon. The substrate half, thus obtained, is aligned end-to-end with the other substrate half 7 as shown in FIG. 1d and bonded together. This bonding can be effectively made by cutting out a portion 8 as indicated by a broken line in the step d and pouring fused low-melting-point glass into the cut-out portion 8. On the upper surface of the recombined subtrate 9 is a magnetic layer 10 which is similar in material to layer 4 and which is formed by the sputtering technique, as illustrated in FIG. 1e. Since the subtrate halves 3 and 7 are magnetically short-circuited by layer 10, this short circuit must be removed by lapping it directly or by coating it with a layer 11 formed of resin or low-melting-point glass as shown in FIG. 1f and then lapping the overlying layers until the coplanar surface of magnetic layers 4 and 10 is reached, thus forming a core 11a as indicated in FIG. 1g. The core 11a has its amorphous layers 4 and 10 bonded to a side core 13 which is formed of a soft magnetic material and on which is wound a coil 12, as shown at h. An essential part of a magnetic head is thus fabricated. The above process is followed by a number of known processes to complete a head assembly. Numeral 14 indicates a nonmagnetic body. It is also possible to use a nonmagnetic substrate instead of the side core to sandwich the magnetic layer by forming a hole through which the coil is wound.

Figure 2A:
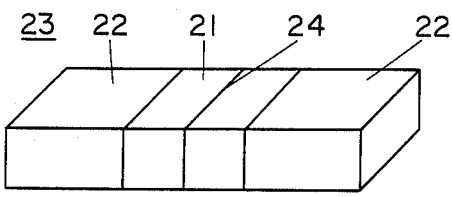
Figure 2B:
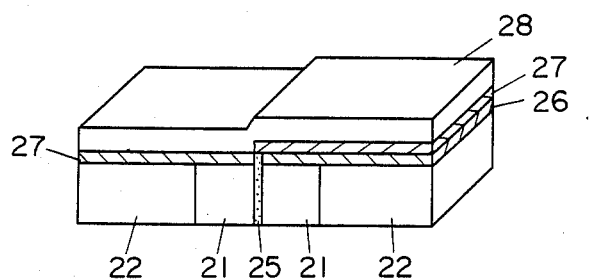
Figure 2C:
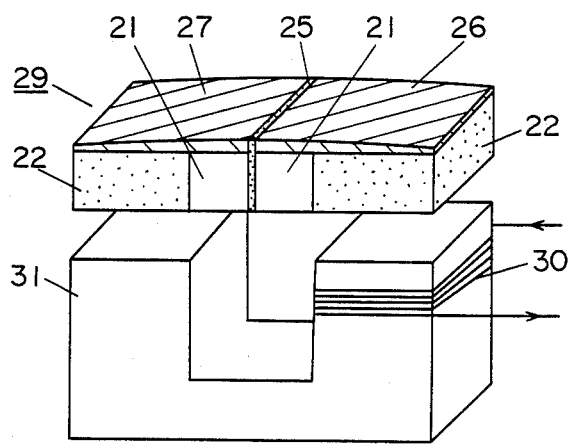

FIGS. 2a–2c illustrate the steps a to c respectively of another embodiment which is a modification of the FIG. 1 embodiment in which the essential parts are similar to those shown in FIG. 1.

A composite substrate 23 comprises a central section 21 formed of a nonmagnetic material and a pair of opposite side sections 22 of ferrite. The substrate 23 is cut off along a center line 24. On one end face of one of the substrate halves is formed a magnetic layer by sputtering technique, which was followed by the steps a to f of FIG. 1 so that a head structure shown in FIG. 2b, is fabricated. In this step, 25 represents a nonmagnetic layer, numerals 26 and 27 represent said magnetic layers, 28 indicating a moulded material. Next, the glass layer 28 is lapped so that it presents a curved surface. A front core 29 having a magnetic gap as shown in FIG. 2c is obtained. A head assembly is completed by having the front core 29 cemented to a ferrite back core 31 having a coil 30.

The head manufacturing methods as taught by the present invention defines a magnetic gap with a high degree of precision not attainable with the prior art method. When using the steps of the FIG. 1 embodiment, misalignment tends to occur between substrate halves 3 and 7 in the step d. If track width is 30 micrometers, such misalignment is not immaterial, but if track width is less than 10 micrometers, the misregistration is problematic.

FIG. 3 is an illustration of another embodiment which is suitable for making a head assembly having a narrow track width.

Figure 3A:
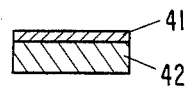
FIGS. 3a–3f and 4a–4e are perspective views illustrating another method of the present invention which is an improvement over the method of FIGS. 1 and 2.
Figure 3B:
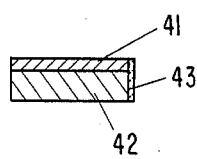
Figure 3C:
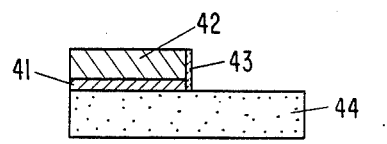
Figure 3D:
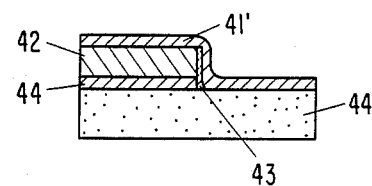
Figure 3E:
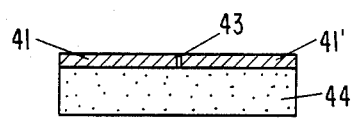
Figure 3F:
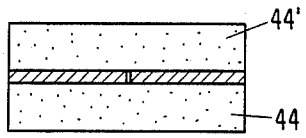
Figure 4A:
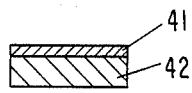
Figure 4B:
Figure 4C:
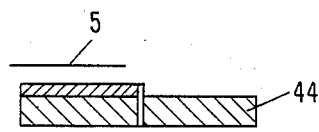
Figure 4D:
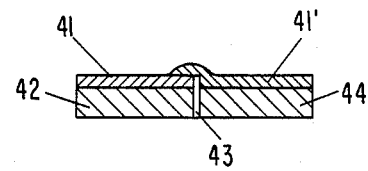
Figure 4E:
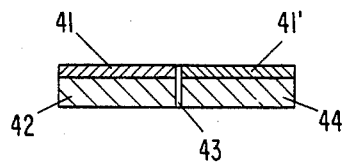

As shown in FIG. 3a, a magnetic layer 41 is formed on the upper surface of a substrate 42 using a sputtering or evaporation technique and one end of which is mirror-finished. This is followed by the step of forming a nonmagnetic layer 43 on the mirror-finished end face as shown in FIG. 3b, by sputtering. The sputtering is continued until the layer 43 has attained a desired thickness. Next, the substrate 42 is placed on the upper surface of a second substrate 44 with the magnetic layer 41 facing downward as shown in FIG. 3c, and bonded together. This bonding can be made by initially coating the surface of the substrate 44 with a layer of a low-melting-point glass with a thickness of 500 to 1000 Angstrom units using sputtering method and subsequently raising the temperature. A composite body can be obtained by sputtering a magnetic layer 41' over the upper surface of the bonded substrates, as shown in FIG. 3d. The composite body of is then cut off along a chain-dot line indicated at d, FIG. 3, and the cut-off plane is polished to obtain a structure shown in FIG. 3e, which a vertical edge of the nonmagnetic layer 43 forming a magnetic gap. Magnetic layers 41 and 41' are precisely aligned horizontally with each other. Side edges of the aligned layers 41 and 41' can be used as a tape contact face and define a narrow track. In a preferred embodiment, a side core 44' is formed on the aligned layers 41 and 41' as shown, in FIG. 3f to render the whole unit into a symmetrical configuration to prevent the head from being worn nonuniformly by contact with a tape and to prevent the tape from being worn by the upper edge of the layers 41, 41'. Resin is sufficient to assure bonding between the side core 44' and the layers 41, 41'. Although FIG. 3 shows only the front elevation of the core structure, the head assembly is complete when a coil is wound through a hole provided in the core.

The process can be simplified by eliminating the cutting step d, FIG. 3, by forming the substrate 42 with a material that can be easily etched and the other parts of the unit with materials which are resistant to etching solution.

FIG. 4 illustrates another embodiment which is an improvement over the FIG. 3 embodiment.

In FIG. 4, the steps shown at a and b are identical to the steps a and b of FIG. 3, respectively. The magnetic layer 41' is effectively sputter-formed using a mask 5 over the magnetic layer 41 as shown at c, since it only requires a lapping process to remove a raised portion of the magnetic layer 41' that overlaps the layer 41 as shown at e, FIG. 4. As shown at e, FIG. 4, by lapping the raised portion, the magnetic layers 41, 41' can be separated by the nonmagnetic gap filling layer which serves as a magnetic gap.

This method is suitable for making narrow-width magnetic hands.

The following is a description of the specific embodiments of the present invention.

EXAMPLE 1

A magnetic head was manufactured according to the steps of FIG. 1. Crystallized glass having a thermal expansion coefficient $104 \times 10^{-7}$ was used for the substrate 1. Amorphous alloy $Co_{88}Nb_8Z_4$ was sputtered on the substrate 1 under the pressure of $2 \times 10^{-2}$ Torr within the environment of argon gas to form magnetic layers 4 and 10. The magnetic gap 6 was created by sputtering $SiO_2$. A front core 11 a manufactured in this way was bonded to the side core comprising ferrite 13 and glass body 14, followed by the provision of a coil.

EXAMPLE 2

Example 2 is similar to Example 1 with the exception that use was made of amorphous alloy $Fe_{80}Zr_{10}Nb_{10}$ and $SiO_2$ for a gap material to form a magnetic gap in the same manner as in Example 1.

EXAMPLE 3

Forsterite was used for the central portion 21 of FIG. 2 and ferrite was used for the side portions 22 to form a composite substrate 23 having a thickness of 300 micrometers. The substrate was cut along the line 24 and amorphous alloy $Co_{81}Mo_3Cr_7Zr_9$ was sputtered on one end face of one of the substrate halves to form a magnetic layer until it attains a thickness of 20 micrometers. This was followed by the steps as in Example 1 and the structure shown at b in FIG. 2 was manufactured. The nonmagnetic layer 25 comprised $SiO_2$. The magnetic layers 26 and 27 each comprised the above noted amorphous alloy and the layer 28 comprised glass. The glass layer 28 was next lapped to present a curved surface as shown at c in FIG. 2. The front core 29 was bonded to the back core 31 with coil 30.

EXAMPLE 4

Example 4 differs from Example 3 in that high-melting-point glass with a thermal expansion coefficient $120 \times 10^{-7}$ was used for the center portion 21 instead of forsterite, and permalloy was used instead of ferrite for the side portions 22 having a thickness of 300 micrometers. Same steps as employed in Example 1 were used in sputtering amorphous alloy $Fe_2CO_{83}Nb_{15}$ in the manufacture of a front core which was bonded to a permalloy back core as shown at c, FIG. 2.

EXAMPLE 5

Example 5 is similar to Example 1 with the exception that high-melting-point glass with a thermal expansion coefficient of $120 \times 10^{-7}$ instead of $104 \times 10^{-7}$ was used for the substrate which was cut into halves one of which was coated with a 10-micrometer thick Sendust alloy. This was followed by steps similar to those in Example 1 to obtain the head shown at h, FIG. 1.

EXAMPLE 6

Life tests were conducted between those made in accordance with Examples 1 through 5 and two magnetic heads made in accordance with a prior art method. In one of the prior art magnetic heads, glass was fused between Sendust core halves to form a magnetic gap therebetween. In the other prior art head, use was made of $Co_{81}Mo_3Cr_7Zr_9$ which is an amorphous alloy of zero-magnetic distortion ribbon having a thickness of 20 micrometers, sandwiched between glass plates 300 micrometers thick each to obtain a total thickness of about 620 micrometers and was cut in half and was processed according the method currently used to make a magnetic gap.

One test cycle consisted of placing the test pieces in an environment of 30° C. with a relative humidity of 90% for a period of 7 days and thereafter subjecting them to a tape contact test for 8 hours on a commercially available video tape recorder. The test cycle was repeated four times for each test piece and the magnetic gap of each tested piece was observed. The results of the observation are listed in the Table below.

| Test Piece | Track Width (μm) | Gap Material | Gap Length (μm) Before Test | Gap Length (μm) After Test | Remarks |
| --- | --- | --- | --- | --- | --- |
| Example 1 (Amorphous alloy head) | 20 | $SiO_2$ | 0.30 ± 0.01 | 0.3 ± 0.01 | — |
| Example 2 (Amorphous alloy head) | 20 | Amorphous Alloy $Fe_{80}Zr_{10}Nb_{10}$ | 0.30 ± 0.01 | 0.3 ± 0.01 | — |
| Example 3 (Amorphous ferrite composite head) | 20 | $SiO_2$ | 0.30 ± 0.01 | 0.3 ± 0.01 | — |
| Example 4 (Amorphous alloy permalloy composite head) | 20 | $SiO_2$ | 0.30 ± 0.01 | 0.3 ± 0.01 | — |
| Example 5 (Sendust head) | 10 | $SiO_2$ | 0.30 ± 0.01 | 0.31 ± 0.02 | — |
| Sendust head* | 30 | High-melting-point glass | 0.30 ± 0.05 | 0.4 ± 0.1 | Gap deformed |
| Amorphous alloy head* | 20 | Low-melting-point glass | 0.30 ± 0.10 | 0.6 ± 0.3 | Gap deformed considerably |

*Prior art heads

As is seen from the test results given above, the magnetic heads made according to the present invention proves high precision in comparison with the prior art heads. While substantial changes in gap length were not observed in the present invention, considerable changes were observed in the prior art gap lengths.

EXAMPLE 7

Amorphous alloy $Co_{86}Nb_{10}Zr_4$ was sputtered on the surface of a ferrite substrate 42 of FIG. 3 to a thickness of 10 micrometers. One end face of the substrate was mirror-finished and $SiO_2$ was used to form layer 43 having a thickness of 0.3 micrometers. The amorphous alloy surface of the composite body was bonded to a substrate 44 of glass having a thermal expansion coefficient $120 \times 10^{-7}$ as shown at c, FIG. 3. The composite body was cut along the chain-and-dot line and lapped to obtain the core shown at e. A second glass substrate was bonded to the amorphous layers 41, 41'. The reason for using ferrite for the substrate 42 is that it is easier than glass to be machined.

EXAMPLE 8

Amorphous alloy $Co_{84}Fe_2Nb_{14}$ was sputtered on a copper substrate 42, FIG. 3, until a thickness of 10 micrometers was attained to form a magnetic layer 41, which was followed by steps as in Example 7 to obtain a composite body as shown at d in FIG. 3 in which the substrate 44 is composed of glass having a thermal expansion coefficent of $120 \times 10^{-7}$ and the gap material 43 was composed of $SiO_2$. The same amorphous alloy was used for layer 41' as in layer 41. The copper substrate 42 was removed by the use of an etching liquid whose main composition is HCl. It is not neccessary to use a mask since the glass substrate, $SiO_2$ layer and amorphous layers are resistant to such liquid. The etching was followed by lapping to obtain the structure shown at e.

EXAMPLE 9

Amorphous alloy $Co_{85}Nb_{10}ti_5$ was sputtered on an NaCl single crystalline body which was used as the substrate 42 of FIG. 3 to form the layer 41. The same process as used in Example 7 was followed to obtain a structure as shown at d, FIG. 3, using the same materials for layer 43 and substrate 44 as used in Example 8. The structure was then immersed in water to remove the NaCl composition, which was then followed by lapping to obtain a flat surface as shown at e, FIG. 3.

EXAMPLE 10

Comparison was made between those manufactured according to Examples 7-9 and a ferrite head having glass fused magnetic gap and the head manufactured according to the steps shown at FIG. 1. The test results are illustrated in the Table below.

| | Track Width (μm) | Optically Measured Gap Length (μm) | Effective Gap Length Measured according to Head-frequency Response (μm) | Track Misalignment (μm) |
| --- | --- | --- | --- | --- |
| Prior Art Glass-fused Ferrite Head | 30 | 0.28 ± 0.02 | 0.30 ± 0.02 | ±2 |
| Example 1 (amorphous alloy head) | 20 | 0.30 ± 0.01 | 0.30 ± 0.01 | ±2 |
| Example 7 | 10 | 0.30 ± 0.005 | 0.30 ± 0.005 | ±0.05 |
| Example 8 | 10 | 0.30 ± 0.005 | 0.30 ± 0.005 | ±0.05 |
| Example 9 | 10 | 0.30 ± 0.01 | 0.30 ± 0.01 | ±0.1 |

As is seen from the Table given above, the magnetic head manufactured according to the invention ensures a high degree of precision in determining magnetic gap length in comparison with the prior art head having a glass-fused magnetic gap and ensures against track misalignement. The invention thus allows manufacture of magnetic heads having narrow track width suitable for high density magnetic recording.

INDUSTRIAL APPLICATION

As is understood from the foregoing description, the magnetic head made according to the invention ensures a significantly smaller gap length variation over the lifetime than those made according to prior art methods as well as a high degree of precision in gap length.

What is claimed is:
1. A method for forming a magnetic gap, comprising:
   (a) sputtering a first magnetic layer on a first surface of a substrate;
   (b) sputtering a nonmagnetic layer on a second surface of the substrate perpendicular to the first sur- face so that the nonmagnetic layer contacts with an edge of said first magnetic layer;

(c) aligning a third surface of another substrate with said first surface;

(d) sputtering a second magnetic layer on an area including said third surface and an end face of said nonmagnetic layer; and (e) lapping a portion of said second magnetic layer until said first and second magnetic layers and said nonmagnetic layer present a common surface plane opposite to a plane defined by the aligned first and third surfaces.

2. A method of fabricating a magnetic head comprising:

(a) sputtering a first magnetic layer on a surface of a first substrate whereby the magnetic layer and the substrate present a common end face perpendicular to said surface;

(b) sputtering a nonmagnetic layer on said common end face;

(c) bonding a second substrate end-to-end to said first substrate with said nonmagnetic layer in between to define another surface aligned with said surface of the first substrate, whereby an edge portion of the nonmagnetic layer is exposed by an amount equal to the thickness of said first magnetic layer;

(d) sputtering a second magnetic layer on an area including said another surface of the second substrate and an end face of said nonmagnetic layer; and (e) lapping said second magnetic layer until the first and second magnetic layers and the nonmagnetic layer present a common surface plane opposite to a common surface plane defined by the aligned surfaces of said first and second substrate.

3. A method as claimed in claim 2, wherein each of said first and second substrates comprises a first body of ferromagnetic material and a second body of nonmagnetic material, said first and second bodies being bonded together, wherein said nonmagnetic layer is located between said second bodies of said substrates.

4. A method as claimed in claim 2, wherein said nonmagnetic material is at least one of glass and ceramic.

5. A method as claimed in claim 2, further comprising the steps of forming a layer of resin on said second magnetic layer prior to step (e) and lapping said resin layer during step (e).

6. A method as claimed in claim 2, further comprising the step of forming a layer of low-melting point glass on said second magnetic layer prior to step (e) and removing said glass layer during step (e).

7. A method of fabricating a magnetic head comprising:

(a) sputtering a first magnetic layer on a surface of a first substrate whereby the magnetic layer and the substrate present a common end face perpendicular to said surface;

(b) sputtering a nonmagnetic layer on said common end face;

(c) bonding said first substrate to a portion of a second substrate with said first magnetic layer in between, thereby defining a first common surface plane;

(d) sputtering a second magnetic layer on an area including the remainder of said second substrate and an end face of said nonmagnetic layer;

(e) lapping said second magnetic layer, said first substrate and said nonmagnetic layer until said first and second magnetic layers and said nonmagnetic layer present a second common surface plane opposite to said first common surface plane; and (f) bonding a third substrate to said second common surface plane.

* * * * *